UNITED STATES PATENT OFFICE.

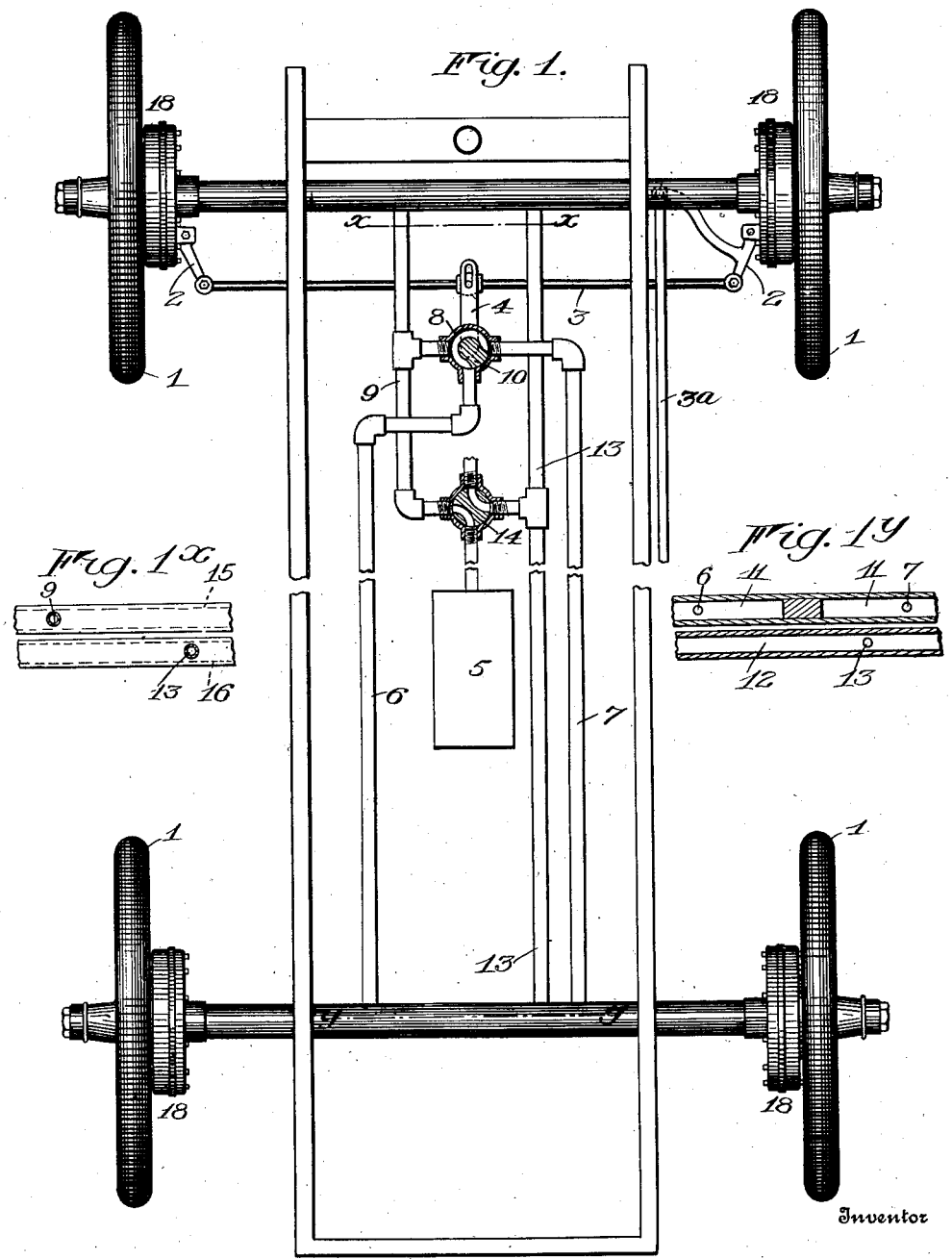

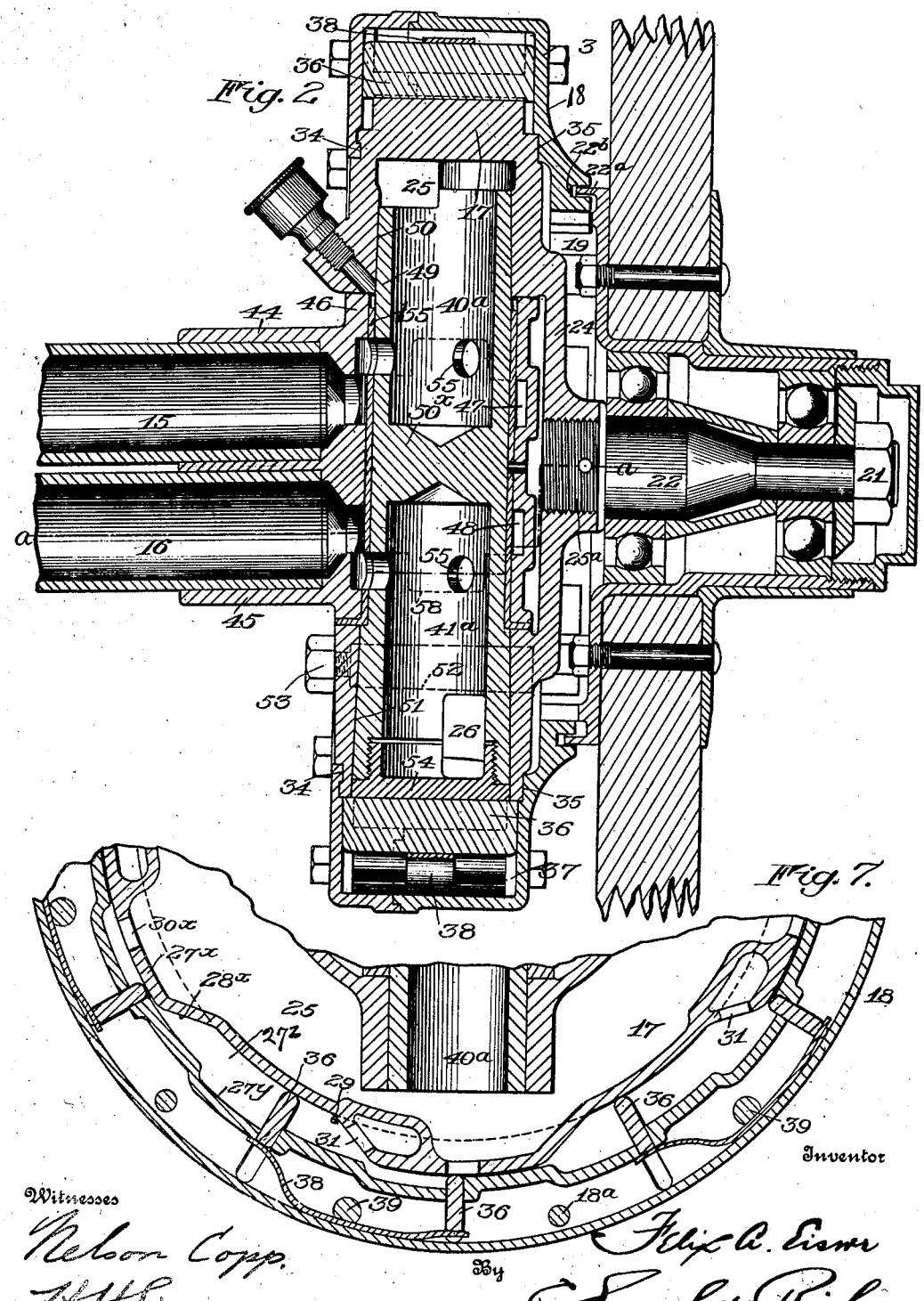

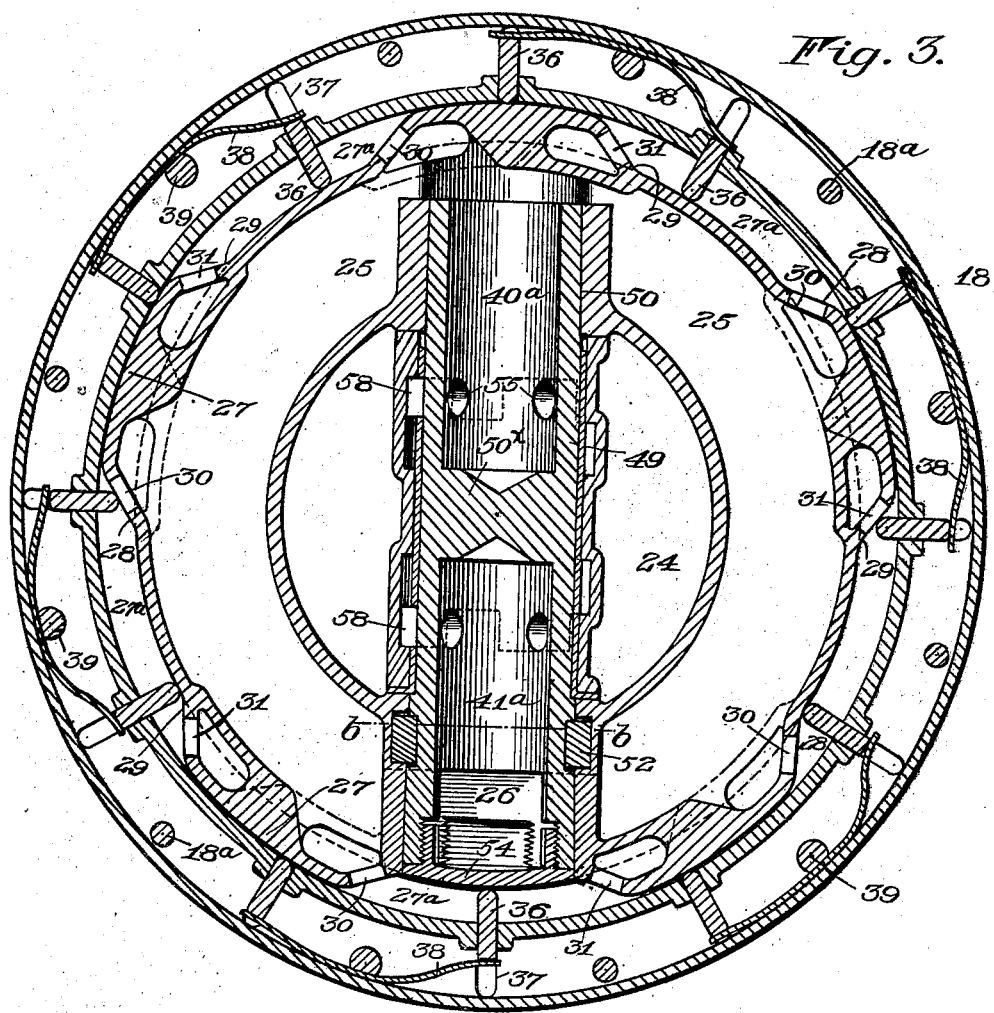

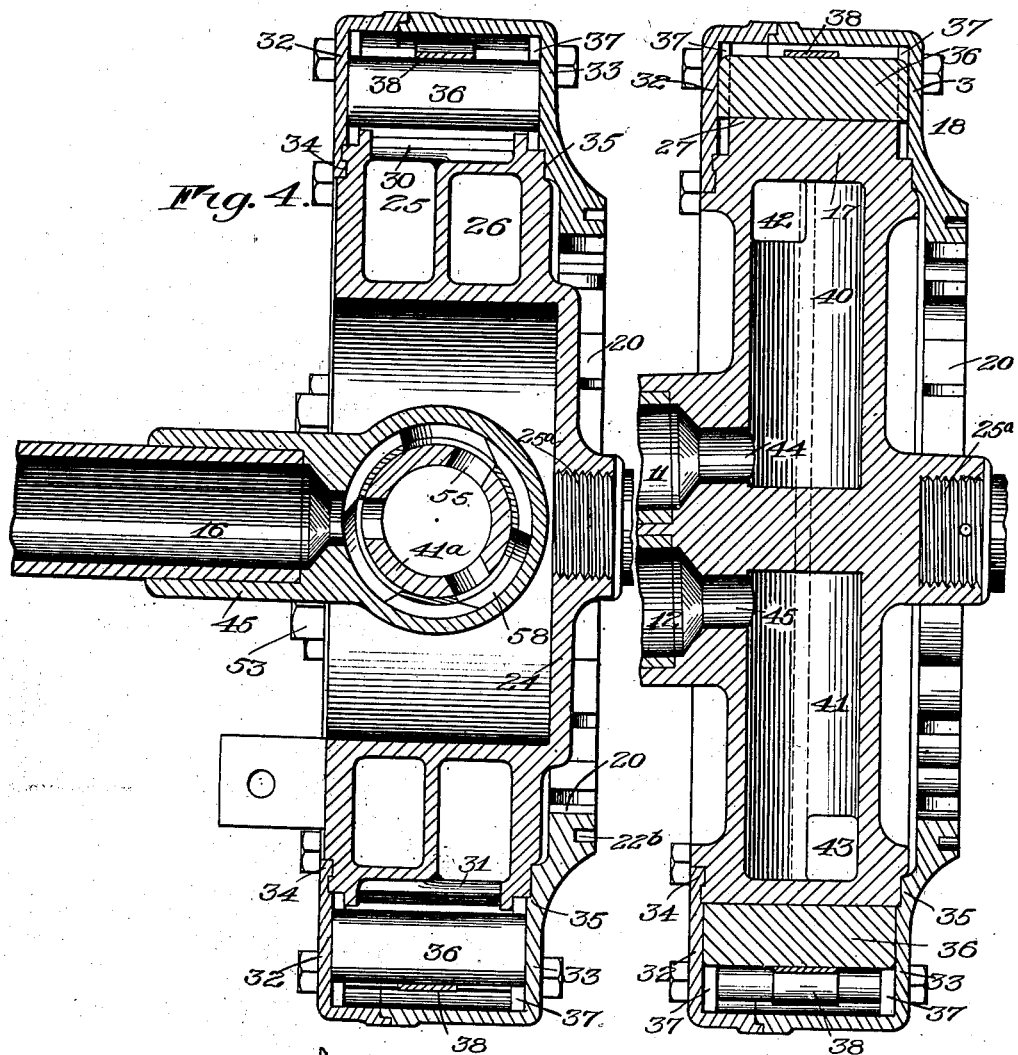

FELIX A. EISNER, OF ROCHESTER, NEW YORK.

CONTROL OF VEHICLE DRIVING-WHEELS.

1,026,662.  Specification of Letters Patent.  Patented May 21, 1912.

Application filed July 10, 1908. Serial No. 442,927.

*To all whom it may concern:*

Be it known that I, FELIX A. EISNER, of Rochester, in the county of Monroe and State of New York, have invented certain new and useful Improvements in Control of Vehicle Driving-Wheels; and I hereby declare the following to be a full, clear, and exact description of the same, reference being had to the accompanying drawings, forming a part of this specification, and to the reference-numerals marked thereon.

The present invention relates to the control of vehicle driving wheels and it has for an object to provide a construction which will permit an equal driving of wheels on opposite sides of a vehicle or a slower driving of wheels on either side in order to obtain a differential action in turning.

Another object is to improve the parts entering into the combination for producing the above results.

To these and other ends the invention consists in certain improvements and combinations of parts all as will be hereinafter more fully described, the novel features being pointed out in the claims at the end of the specification.

In the drawings wherein I have shown the invention embodied in a vehicle for traveling on land, Figure 1 is a plan view of a vehicle body constructed in accordance with my invention; Figs. 1$^x$ and 1$^y$ are detail sectional views on lines $x$—$x$ and $y$—$y$ Fig. 1; Fig. 2 is a detail vertical section through one of the front motors, and proximate portions of the front axle and a front wheel; Fig. 3 shows one of the front motors in vertical section at right angles to the section shown in Fig. 2; Fig. 4 is a horizontal section through a front motor and the front axle on line $a$—$a$ Fig. 2; Fig. 5 is a section on line $b$—$b$ Fig. 3; Fig. 6 is a vertical section of one of the rear motors; and Fig. 7 is a detail sectional view of a motor constructed in accordance with this invention, in which an expansible fluid may be employed.

In the embodiments shown I employ a wheeled vehicle which may have four wheels 1, preferably having the forward ones only mounted to swing in order to steer the vehicle and being controlled by a steering device embodying arms 2 connected by a bar 3 and operated in any suitable manner, as by a pull bar 3$^a$.

In order to obtain a direct driving of all the wheels so as to dispense with gearing and other friction producing devices, I connect a motor directly to each wheel. Provision however should be made for obtaining a differential movement of the motors on opposite sides of the vehicle in order that the wheels on one side may turn slower than the wheels on the other when turning corners. In this instance this differential movement is effected in the rear wheels by controlling the motor driving medium with the control of the steering device, while the control of the driving medium to the motors of the front wheels is effected with the swinging of the wheels.

It is preferred to employ a fluid as the motor driving medium and to employ fluid motors. To this end I may mount an air compressor and a reservoir of any suitable construction at 5 on the vehicle and connect it to channels or passages formed in the front and the rear axles and connected to the motors.

The connection between the fluid supply reservoir and the two rear motors may be in the form of two pipes 6 and 7 branched from the casing 8 of a valve which by a connection 9 communicates with the reservoir. Within the casing 8 is a rotary valve member 10 which in one position permits the connection 9 to supply both pipes 6 and 7 equally and consequently both rear motors, in another position permits it to supply less to pipe 6, and its motor, and in still another position permits it to supply less to pipe 7 or its motor, being shown in the first mentioned position in Fig. 1. This valve member may be connected to the steering device as by being arranged on the shaft of the arm 4 which has a pin and a slot connection with the connecting bar 3 so that when the bar is shifted in either direction to cause the wheels to swing, the fluid to the motor of the rear wheel, that is to move slower, will be partially cut off, while the other one will receive its usual supply. The rear axle should of course have separate inlet passages 11 to its two motors, but a single passage 12 may be employed as an exhaust for both and connect by pipe 13 with a reversing valve 14 which also has communication with connection 9 whereby fluid may be sent through the exhaust pipe to reverse the direction of travel of the vehicle.

The front motors are carried with the front spindles 22 which may, as before stated, be mounted to swing forwardly and rearwardly relatively to the front axle to guide the vehicle. For this swinging movement, the axle may have at each end a vertical bearing sleeve 46 provided with laterally extending socket pieces 44 and 45 to receive the tubes of which the axles are formed, while carried with each spindle is a vertical bearing 49 which coöperates with the bearing sleeve 46. Fluid from the fluid supply passes from the pipe 9 to a passage 15 formed in the front axle and common to both motors and from the axle to the motors through communicating passages formed in the bearings 46 and 49, preferably in a manner to be described. From the motors the fluid passes to the common passage 16 in the axle by way of passages in the bearings as will be hereinafter set forth, and from the axle to pipe 13, the latter connection permitting a reversal of the flow through the front motors with the reverse of the rear motors. The motors preferably employed in this instance, each embody a stator 17 and a rotor 18. The stators are mounted preferably in the manner to be described, while the rotors are connected to the wheels as for instance by clutches such as projections 19 on the inner face of each wheel adapted to enter notches 20 on the outer face of the rotor, the clutch members being held in engagement by a nut 21 which also serves to hold the wheel on its spindle 22. A dust excluding device for the spindle may be arranged between each wheel and its rotor and may consist of an annular flange 22$^a$ on the wheel fitting within a groove 22$^b$ on the rotor about the clutch.

The stators are shown in Figs. 1 to 6 each comprising a ring shaped or annular member or casing having the outer side of its central opening closed by a wall 24 from which projects a spindle 22, the spindle being detachably secured thereto if desired by screw threads 25$^a$. Within this casing 17 may be formed two substantially annular passages or chambers 25 and 26 arranged side by side and having fluid admitted and exhausted therefrom preferably in the manner to be described, while projecting from the periphery of the stator is a series of fixed projections or abutments 27 having their opposite side walls beveled or inclined at 28 and 29 and provided with inlet and exhaust openings 30 and 31 respectively which communicate respectively with chambers 25 and 26.

The rotors are preferably of ring or annular formation and surround the stator. Each rotor in this instance is made hollow and has flanges 32 and 33 projecting inwardly toward the stator and guided on opposite sides thereof at 34 and 35. The flanges on the rotor inclose the spaces between the projections 27 and form fluid chambers 27$^a$ between the stator and the rotor for the movable abutments or piston blades 36 which are carried by the rotor. In order that it may be removed from the stator the rotor is formed in two sections connected by pins 18$^a$. The piston blades 36 in this instance are mounted to slide through the inner wall of the rotor on radially arranged guides 37 and are pressed toward the stator in any suitable manner as by leaf springs 38, the two ends of each of which coöperate with two blades and a pin or bar 39 supports it between its ends. In operation the pistons travel over and in contact with the periphery of the stator and are pressed outwardly by engagement with one inclined face of a projection 27 and inwardly by the springs as the opposite inclined face is reached. Fluid issuing from one of the chambers 25 and 26, depending on the direction of rotation of the motor passes from the series of openings 30 and 31 and strikes the blades as they are passing down the inclines 28 or 29 causing the blades to be carried along the fluid chambers 27$^a$ until the opening in the incline at the opposite end is reached by the piston, when the fluid exhausts. The pistons are arranged at such a distance apart that as one piston opens an exhaust of one fluid chamber another piston closes the inlet to the same chamber, thus preventing fluid passing directly from the inlet to the exhaust without performing any work.

Instead of a rotary fluid pressure motor as described I may employ an expansion motor which may be constructed as shown in Fig. 7 where the projections 27$^x$ have the openings 30$^x$ in their outer ends instead of on their inclined walls 28$^x$ and the inner face of the rotor has chambers 27$^y$ formed therein on one side of the blades 36. In this construction an expansible fluid such as air, gas or steam is employed and when a chamber 27$^y$ reaches the opening 30$^x$, the chamber is filled with the compressed fluid which is then carried to a chamber 27$^z$ where it expands between an inclined wall 28$^x$ and a blade 36.

A fluid motor constructed in accordance with this invention has its rotor and its stator concentrically arranged and the fluid acting simultaneously, at a plurality of points about the axis of the rotor under pressure as distinguished from speed or velocity so that the rotor turns with little friction on its bearings. The stator for the rear motors are preferably rigidly connected to the rear axles and for this purpose may each surround a member formed with a pair of radially extending chambers 40 and 41 each of which communicates at its outer end at 42 or 43 with one of the annular chambers, and at its inner end has a lateral extension 44 or 45 which receives an end of one of the tubes of which the rear axle is formed. The stators for the front wheel each surround a bearing 46 and a bearing 49, and in order that these bearings may establish communication between the fluid supply and the motors I may provide each sleeve with two internal annular chambers 47 and 48 and its coöperating bearing member 49 with two chambers or passages 40ª and 41ª separated by a wall 50ˣ and communicating at their inner ends with the channels 47 and 48 by ports or openings 55, and at their outer ends with chambers 25 and 26 respectively. Preferably the hollow bearing portion 49 is formed separately from the stator in order that it may be removed for the purpose of repair. In this instance the stator is provided with two diametrically opposite tapering seats 50 and 51, the latter opening at the circumference of the stator to permit the insertion of the bearing 49 which of course to conform to the seats 50 and 51 is made tapering. This taper of the parts enables me to secure a fluid tight joint, and to secure the bearing in position by two wedge bolts 52 one on each side of the taper bearing 49 (see Figs. 3 and 5) held in opposed grooves in the bearing 49 and seat 51 by nuts 53. The outer end of the chamber 41ª may be closed by a screw plug 54 whose top is curved to conform to the exterior line of the stator between the projections in order that the blades 36 may freely pass thereover. Wear or bearing sleeves 155 are preferably introduced in the sleeve 46.

In order that I may reduce the fluid to one of the front motors when its wheel swings to the rear I provide the chambers 47 and 48 with lateral or offset pockets 58 (see Fig. 4) which are greater in width than the ports 55 and have the latter communicating or registering therewith when the spindles are alined. However, when either spindle is swung rearwardly the wall of the bearing sleeve between the pockets partially closes the ports and reduces the supply of fluid. This arrangement provides a controller for each motor operating on the swinging of a spindle in one direction and axially alined with the bearings for the spindle.

The operations of the several parts have been specifically set forth with the description thereof and therefore it will be necessary at this point to describe only generally the operation of the invention: Compressed air or other fluid from a supply 5 is sent simultaneously to all the motors as long as the vehicle is running straight ahead. When the steering device is operated to steer the vehicle the fluid to the motors on one or the other side of the vehicle is reduced thereby causing the wheels on that side to rotate slower than those on the other in turning, this being effected for the rear motors by the valve member 10 and for the front motors by the valves formed by bearings 46 and 49. The reduction of the supply to the motors is proportional to the curve which the wheel is to make, so that while the driving action of the slower moving motors is reduced, yet they still act to drive their wheels to prevent skidding.

A vehicle constructed in accordance with this invention is comparatively inexpensive to manufacture as very little machine work is required, nearly all of the parts being formed by casting. Further the vehicle will run easier as a direct driving is secured thus dispensing with parts producing friction and at the same time liable to get out of order. While the invention has been shown embodied in a motor vehicle for traveling on land it is apparent that in its broadest aspect it is capable of being embodied in water vehicles and in vehicles for traveling in the air.

What I claim is:

1. The combination with a vehicle having driving wheels on opposite sides thereof mounted to swing relatively to the vehicle body, of motors each driving one of said wheels, a steering device, and controlling means for the motors operated by the steering device and adapted to effect the equal driving of the motors when the vehicle is moving straight ahead and an unequal driving of the motors when the vehicle is turning.

2. The combination with a vehicle having driving wheels on opposite sides thereof, of a pair of fluid motors for driving the wheels, a fluid supply connected to both motors, means for controlling the supply, having one position for effecting the equal driving of both motors, another position for effecting the slower driving of one motor, and still another position for effecting the slower driving of the other motor and steering mechanism for the vehicle operatively connected to the fluid controlling means.

3. The combination with a vehicle having driving wheels on opposite sides thereof, of a pair of fluid motors for driving the wheels, a fluid supply connected to both motors, and a valve in said connection having one position effecting the equal driving of both motors, and two other positions, each effecting the slower driving of one motor and a steering mechanism for the vehicle operatively connected to the valve.

4. The combination with a vehicle having driving wheels on opposite sides thereof, of a pair of fluid motors for driving the wheels, a fluid supply connected to both motors, a valve in said connection, and a steering device for the vehicle connected to the valve.

5. The combination with a spindle, of a stator arranged at the inner end of the same, a rotor surrounding the stator and held to the latter, and a wheel turning on the spindle and having a connection with the rotor permitting the removal of the wheel from the spindle without removing the rotor.

6. The combination with an axle, of a motor mounted to swing relatively to the axle and comprising a stator and a rotor, a spindle mounted to swing with the stator, and a wheel turning on the spindle and having connection with the rotor permitting said wheel to be removed from the spindle without removing the rotor.

7. The combination with a spindle, of a rotary motor carried by the spindle and comprising a stator and a rotor held to the stator, a wheel mounted to turn on the spindle, a clutch between the rotor and the wheel arranged to permit the wheel to be separated from the rotor while the latter is held to the stator, and a device for holding the wheel on the spindle and the clutch members in engagement.

8. The combination with an axle having a vertically arranged bearing at one end, of a motor comprising a rotor and a stator surrounding the bearing and carrying a vertical bearing coöperating with the first named bearing, a spindle carried by the stator, and a wheel mounted on the spindle and having a connection with the rotor permitting the wheel to be removed from the spindle without removing the rotor.

9. The combination with a sleeve, of a rotary motor comprising a rotor and an annular stator surrounding the sleeve, tapering seats at diametrically opposite points on the stator, one of which opens at the periphery of the stator, a bearing member extending through the sleeve and having tapering portions fitted to said seats, wedge bolts arranged on opposite sides of the bearing member to hold it in position, and a spindle carried with the stator.

10. The combination with an axle having a swingingly mounted spindle at each end, of a motor carried with each spindle, and a controller for each motor operated to vary the speed of its motor on the swinging of its spindle in one direction.

11. The combination with an axle and a spindle having coöperating vertical bearings, of a suitably supported motor, and a controller for varying the speed of the motor, axially alined with the bearings.

12. The combination with an axle, of a spindle mounted to swing at each end of the axle, a motor carried by each spindle, and a controller for each motor operated automatically to reduce the supply to its motor on the swinging of its spindle to the rear.

13. The combination with an axle having a swingingly mounted spindle, of a motor carried with the spindle, and a controller for the motor operated automatically to vary the speed of the motor on the swinging of the spindle.

14. The combination with an axle carrying a vertical bearing formed with a fluid circulating passage, of a spindle carrying a coöperating vertical bearing formed with a fluid circulating passage communicating with the passage in the bearing of the axle when the spindle is in one position and partially closed to said passage when the spindle is in another position, and a fluid motor for driving a wheel on the spindle carried with the latter and having communication with the circulating passages of the vertical bearings.

15. The combination with a bearing sleeve formed with an annular passage having pockets offset therefrom, of a spindle carrying a bearing portion fitting the said sleeve and having a chamber formed with ports of less width than the pockets adapted to register with the latter when the spindle is in one position and to be partially closed by the walls between the pockets when the spindle is in another position, and a motor carried with the spindle and adapted to drive a wheel on the latter and having communication with the circulating passages of the vertical bearings.

16. The combination with an axle formed with inlet and exhaust passages, of a bearing sleeve at each end of the axle having a pair of annular chambers communicating with the inlet and the exhaust passages in the axle and having pockets offset therefrom, a pair of rotary motors each comprising a rotor and a stator, the latter surrounding the bearing sleeve, a bearing member arranged within the central opening of each stator, connected to diametrically opposite points thereof and having two chambers communicating with the inlet and the exhaust of a motor at their outer ends and provided with openings at their inner ends registering with the pockets in one position and partially closed by the portions between the pockets in another position, and a spindle carried with each stator and adapted to receive a wheel to be driven by a rotor.

FELIX A. EISNER.

Witnesses:
HAROLD H. SIMMS,
RUSSELL B. GRIFFITH.